United States Patent Office 3,461,934
Patented Aug. 19, 1969

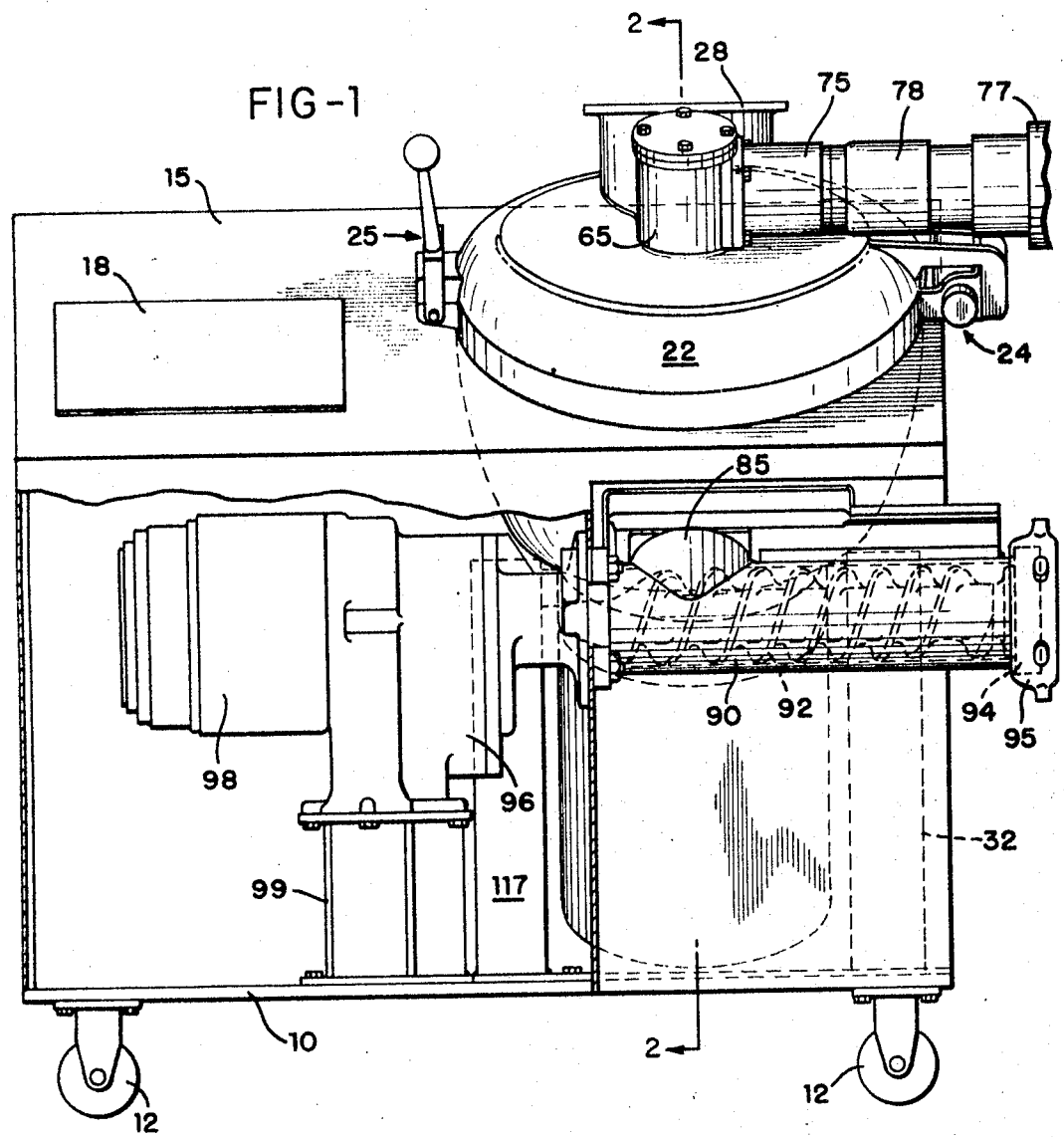

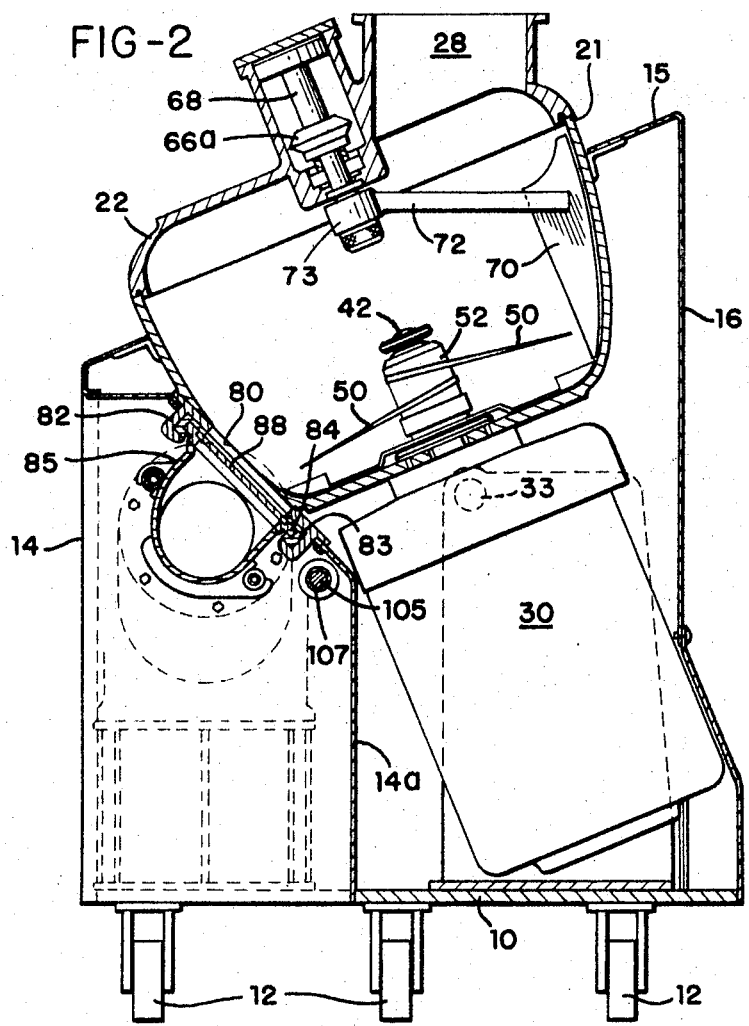
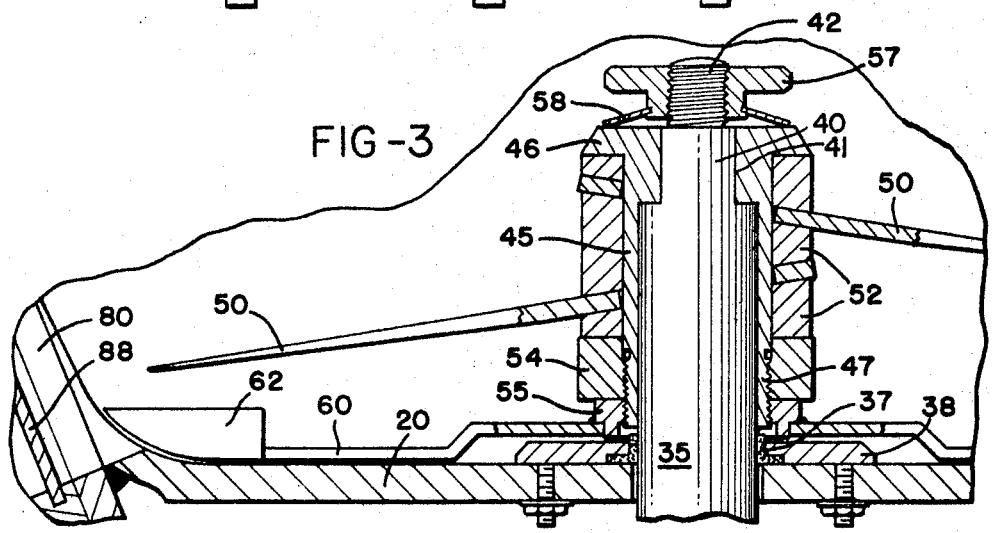

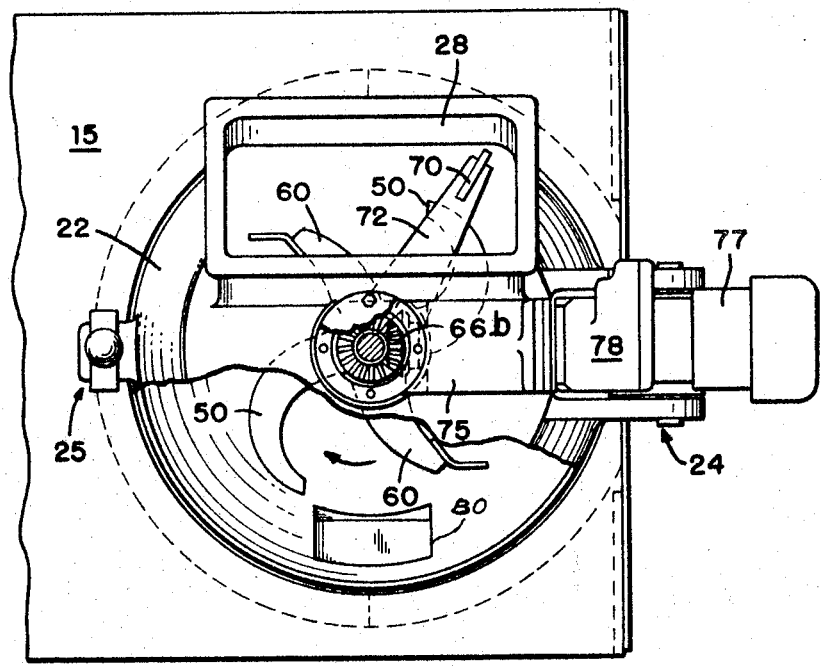
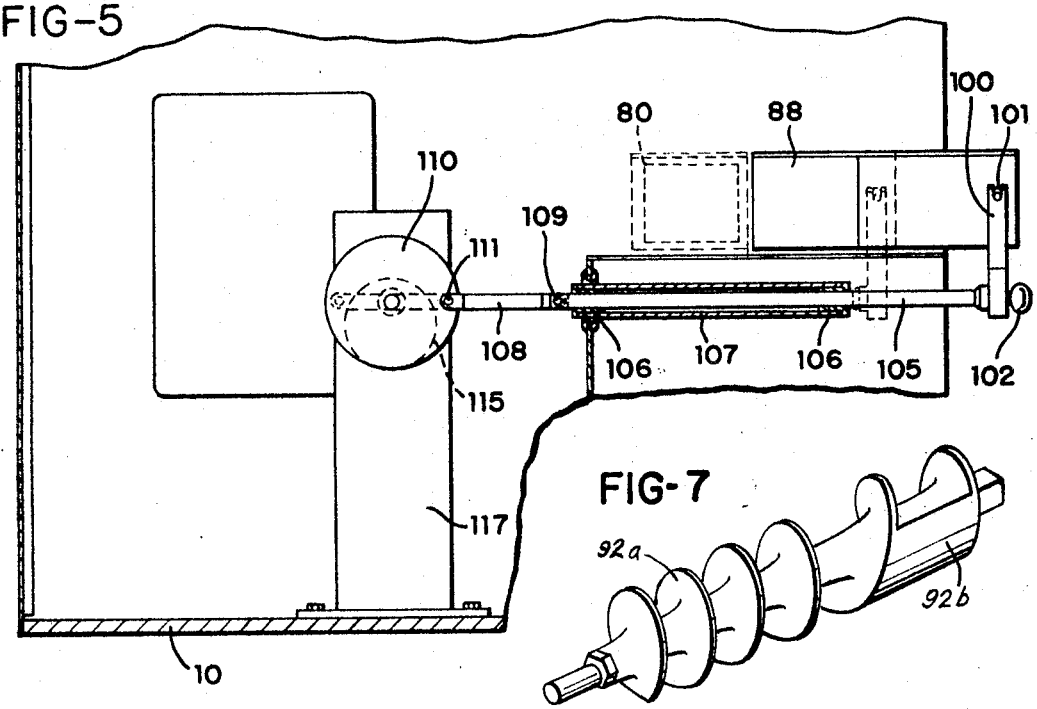

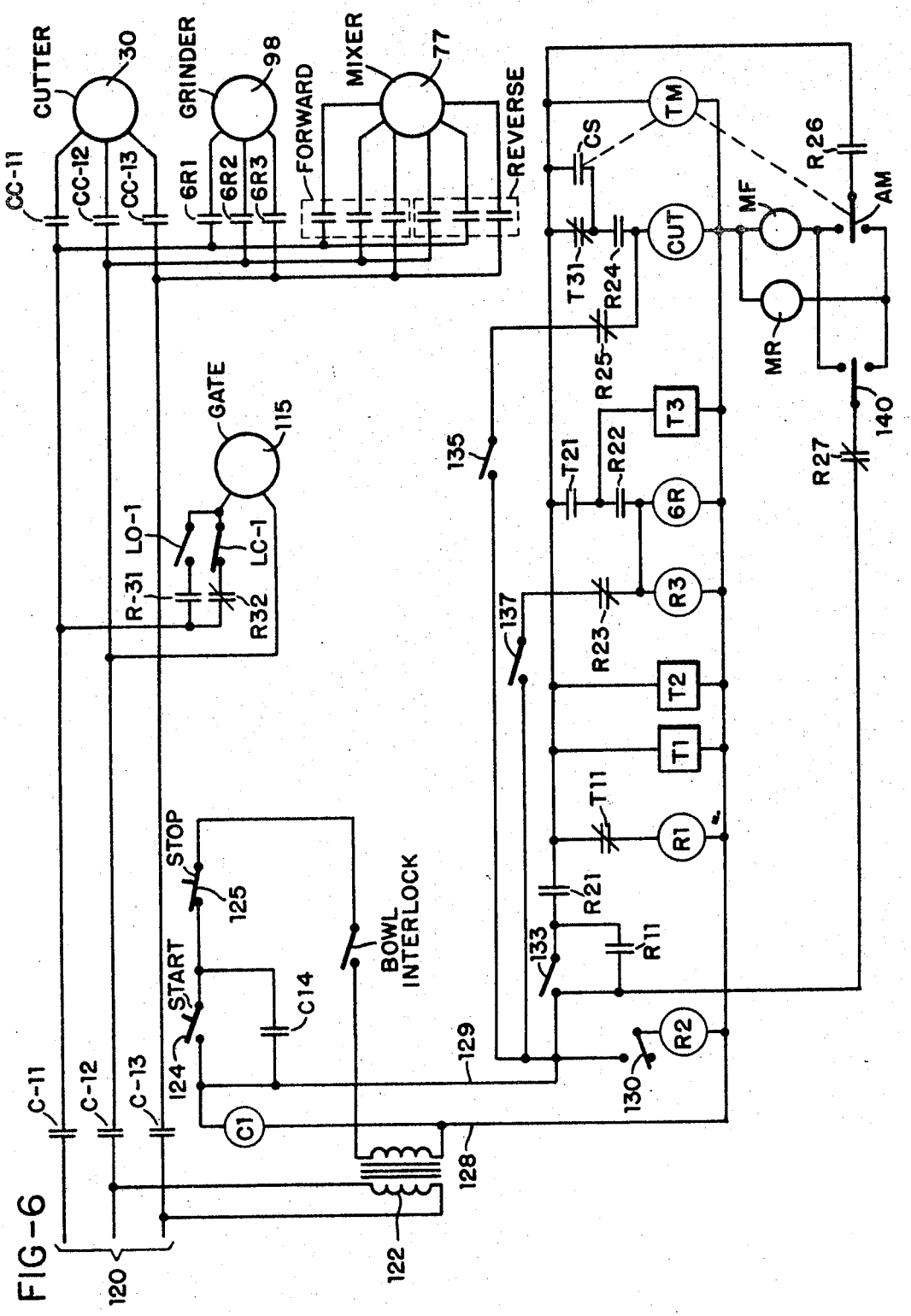

3,461,934
APPARATUS FOR CUTTING, MIXING AND GRINDING MATERIALS
Barrett Bradford Waters, Troy, Ohio, assignor to The Hobart Manufacturing Company, Troy, Ohio, a corporation of Ohio
Filed June 2, 1967, Ser. No. 643,254
Int. Cl. A47j *43/04, 44/00*
U.S. Cl. 146—79                        14 Claims

ABSTRACT OF THE DISCLOSURE

A high speed cutting and mixing device receives large pieces of food or other material to be processed, such as chunks of frozen meat to be made into ground meat. The cutting and mixing device reduces the chunks into small pieces of relatively uniform size and blends in other materials as desired. The bowl of the cutting device is generally circular in cross-section and mounted with its vertical axis inclined. A gate in the lowermost part of the bowl opens into the barrel of a worm type of food chopper through which the cut and blended product is fed and processed. Separate coordinated controls and drives are provided for the cutting-mixing device and for the chopper, and there is a drive for a gate controlling discharge from the cutting-mixing device into the chopper. Operation of these drives is controlled in timed sequence which may be varied according to the type of food input and the type of product desired.

Background of the invention

The invention relates to machinery for processing materials, particularly foods such as meat, in order to provide a thoroughly chopped and blended product from raw ingredients, usually supplied in large pieces or chunks. High speed cutting and mixing machines have been proposed for reducing large chunks of food into small relatively uniform pieces, and simultaneously blending the pieces, sometimes mixing in other ingredients which have beeen added in bulk form with the meat placed in the bowl of the machine. Machines of this type are disclosed in U.S. Patents Nos. 2,918,956 and 3,156,278, and these machines are capable of handling large quantities of foods, depending upon the size of the machine. For example, a commercial machine of this type equipped with a forty quart bowl can cut, mix, and blend the ingredients, for 240 portions of meat loaf in less than one minute. Generally the bowl of these machines, as shown in said U.S. Patent No. 2,918,956, is pivotally mounted for convenient discharge of the bowl contents.

Machines for chopping food products, often referred to as a worm or screw type of chopper are also known and a typical such chopper is disclosed in U.S. Patent No. 2,012,167. Recently, there has been a trend in the art to refer to these machines as grinders. Likewise, it has been proposed to operate these worm type choppers in tandem, with a mixing operation in between, such as disclosed in U. S. Patent No. 3,054,431, the desire being to obtain a uniformly chopped and blended product particulary where processing meat. These chopping machines are capable of taking fairly large chunks of food, for example pieces about the size of a three or four inch cube, however it is difficult to feed frozen foods in particular into this kind of chopper, and even the largest sizes of such choppers cannot receive pieces larger than mentioned, partially due to the necessary guard arrangements on the throat of the machine.

Therefore, at present if it is desired to utilize the advantages of the cutting-mixing device, particularly regarding speed and ability to blend thoroughly, and to operate on large bulk pieces of foods, even solidly frozen foods such as large pieces of frozen meat, it is necessary to perform the operations of cutting, mixing and blending in a machine that mixed as it cut, and remove the resultant cut and blended product and feed is separately through a worm type chopping machine. This requires substantial labor and time, is somewhat awkward, and does not always result in a uniform product since the batch operations are being performed at separate times, usually in separate places, and perhaps even under the control of different persons. As a result, the advantages of these two types of machines have not been utilized to the fullest extent.

Brief summary of the invention

The present invention provides a novel apparatus which combines the cutting, mixing, and blending function and the screw type chopping or grinding function into one piece of machinery which is coordinated and controlled to produce a uniform food product even though operating in batch fashion, and capable of accepting ingredients in large chunks, and separate portions to be thoroughly mixed and blended.

The primary object of this invention is to provide a food processing machine which will accept large pieces, even frozen, of material such as meat, together with ingredients, including liquid, or fatty additives, to be mixed and blended, wherein the input food is thoroughly cut and blended into small relatively uniform pieces to a desired fineness, then automatically discharged into a screw type food chopping or grinding machine which performs the final operations on the food and discharges a uniformly cut, blended and ground product. In order to achieve uniformity of products with successive batches, the invention also provides controls which can be varied in length of operation by the operator, for the cutting-mixing function of the machine and for the final grinding function. The invention also provides a novel device in the cutting and mixing machine for achieving complete discharge from its bowl into the throat and barrel of the chopping device.

Other objects and advantages of the invention will be apparent from the following description, the accompanying drawings and the appended claims.

Brief description of the drawings

FIG. 1 is a side elevational view of apparatus as provided by the invention;

FIG. 2 is a vertical section taken generally on line 2—2 of FIG. 1;

FIG. 3 is a detail view of the elements in the cutting and mixing device which assure complete discharge from its bowl;

FIG. 4 is a top view of the mixing bowl, its inlet hopper, and the drive for the rotary mixing baffle;

FIG. 5 is a detail view of the gate or slide which controls the opening in the passage between the bowl and the throat of the screw type grinder;

FIG. 6 is a schematic circuit diagram of the electrical control for the machine; and FIG. 7 is a view of a modified grinder worm.

Description of the preferred embodiment

Referring to the drawings which illustrate a preferred embodiment of the invention, and particularly with reference to FIG. 1, the machine includes a base 10 which may be mounted on casters 12 for convenience. The base supports a sheet metal housing including a front 14 (partially broken away in FIG. 1) and upwardly and rearwardly sloping top 15, and a back 16. The right front portion of this housing, as viewed in FIG. 1, includes a setback such that the section 14a of the front wall in this area is inset from the front edge of the base. A control panel 18 is mounted on the upwardly sloping wall 15, providing a convenient location for the electrical controls, as will be described.

A generally symmetrical cutting and mixing bowl 20, of circular cross-section, is supported in a position such that its upper portion ending in a rim 21 extends for a short distance upwardly from the top housing wall 15. A cover 22 is supported on the bowl by a hinge 24, and a conventional lock and control arm 25 is provided opposite the hinges that hold the lid locked on the upper edges of the bowl in its normal position. An inlet hopper 28 is formed in the uppermost part of the cover, providing a direct opening to the interior of the bowl 20.

The lower end of the bowl is suitably attached to the housing of the cutter-mixer drive motor 30, and the entire bowl, lid, and motor is supported on upright brackets 32, by means of supporting pins 33. The vertical axis of the motor and bowl assembly is preferably inclined in an upward and forward direction, as viewed from the front of the machine as shown in FIG. 1. This inclination is best seen by reference to FIG. 2, and a preferred angle of inclination locates the center line of the motor 30 at an angle of between 15 and 30 degrees with respect to vertical inclination.

Referring to FIG. 3, the drive shaft 35 of motor 30 extends through the bottom of bowl 20, and is surrounded by a seal 37 held in place by a gland 38. The end of the motor shaft extends upward into the bowl and terminates in an upper end including a drive portion 40 having flats or other suitable parts of irregular cross-section 41, formed thereon. Above this portion there is a threaded end 42 on the motor shaft. A knife shaft or sleeve 45 fits over the drive end 40 of the shaft and extends downward to a location immediately above the seal 37. The knife shaft includes an upper flange 46 and a threaded lower end 47 which forms part of the retaining structure of the main knives of the cutting and mixing unit.

These knives 50 extend outwardly from the knife shaft, and preferably are of tapered construction which may be curved outwardly and rearwardly with respect to the direction of rotation, somewhat in the nature of a scimitar. These knife blades fit over the hollow shaft 45 and are engaged by tapered retaining bushings 52 which may be rotated to vary the downward inclination of the knives. Below the lowermost bushing there is a spacer 54, beneath it a nut 55 threaded to the lower end 47 of the knife shaft. The entire knife shaft assembly is held on the motor shaft by a nut 57 on the threaded upper end of the motor shaft, and a disc-type spring 58 is provided to hold the nut securely in place.

The lowermost retainer nut 55 has attached to it a plurality of arms 60, and at the end of these arms, contoured generally to the shape of the curved bottom edge of the bowl 20, there are small discharge paddles 62 which preferably lag the knives by about 90 degrees. These paddles rotate with the knives, however their primary function is to assure emptying of the bowl at the proper time, as explained hereinafter.

The lid 22 has a gear housing 65 thereon, containing a set of bevel gears, and the gear 66a (FIG. 2) is attached to a mixing shaft 68 which is suitably mounted in bearings within the housing 65. A rotatable mixing baffle 70, contoured to the curved sides of the bowl, is mounted for movement around the sides of the bowl beyond the edges of the knife blades 50. For this purpose the baffle is secured to an arm 72 which in turn extends from a hub 73 suitably fastened to the mixing shaft 68. As shown in FIGS. 1 and 3, a drive housing 75 extends from the side of the gear housing 65, and a mixing baffle drive motor 77 is connected through a gear reduction unit 78 to the bevel gear 66b. In this way the mixing baffle 70 can be operated independently of the main drive motor 30.

At the lowermost portion of the bowl 20 there is a discharge opening 80 (FIG. 2) formed through the wall of the bowl and surrounded by a slide bracket 82 which is fastened to the bowl, preferably as an integral part. Within this bracket there is an internal slide bracket 83 which cooperates with the flanged end 84 of a meat chopper throat 85 to form a guideway for a reciprocable slide 88. This slide forms a gate or valve which when opened permits material in the bowl 20 to discharge through the opening 80 into the chopper throat 85.

The throat housing 85 is formed as part of the barrel 90 of a conventional screw-type meat grinder or chopper having a rotatably mounted worm or screw 92 which picks up material up from the inlet or throat 85 and forces it through a suitable die 94 which is held in place on the end of the barrel by a retainer ring 95. Typical details of construction of such a device are shown in U.S. Patent No. 2,012,167. The worm is driven through a reduction gear unit 96 by a separate electrical drive motor 98 which is supported on a pedestal 99 secured to the base 10.

Referring particularly to FIGS. 2 and 5, the control for operating the gate or slide 88 includes an arm 100 having a forked end which engages around a pin 101 extending outwardly from the surface of the gate, at a location beyond the supporting slide structure. This arm in turn is fastened, for example by a thumb screw 102, to a reciprocable rod 105. This rod is slidably mounted in bushings 106 which are supported in a tube 107 that is secured to and projects from the housing, into the open region where the barrel 90 is located, and directly behind this barrel as shown particularly in FIG. 2. The end of rod 105 extending within the housing is fastened to a link 108 by a pivot pin 109, and the other end of this link is connected to a control disc or crank 110 by a further pivot pin 111. Rotation of the disc 110 will move the link between two positions, with the full open position where the gate 88 uncovers opening 80, being shown in full lines, and the closed position shown in dotted lines. This disc or crank is rotated as desired by a separate drive motor 115 which is suitably supported on a bracket 117 directly behind the gearbox 96 (FIG. 1). Suitable limit switches (later described) are provided to control the motor 115 and thus to define the open and close positions of gate 88.

In operation the ingredients to be prepared are placed in the bowl 20 merely by dropping or pouring them through the inlet hopper 28. In the case of feed preparation this may be for example large chunks of beef or other meat, or mixtures thereof, together with other ingredients including liquid, powdered, or solid seasonings. With the gate 88 closed the motor 30 is operated to rotate the knives, and the action of the knives is such as to induce a mixing flow of the material downward through the path of the knife blades 50 and upward and outward along the curved walls of the bowl, to fall toward the center of the bowl and again downward through the path of rotation of the knives. This induced flow of the material produces a thorough mixing of all the ingredients in the bowl, and also enables the knives to cut the falling material cleanly, producing a finely cut product with small pieces of substantial uniform size. The baffle motor 77 may be operated during at least part of this time to rotate the mixing baffle 70 to be sure that the cut and mixed material does not cling to the walls of he bowl but enters into the aforementioned circulation.

After the motor 30 has been operated for a sufficient time to produce the desired cutting and mixing of the material, motor 115 is energized to open the discharge gate or valve 88, and motor 98 is energized to operate the chopper worm. At this time the motor 30 continues to operate and as the material discharges through the chopper the discharge impeller blades 62 tend to sweep material remaining in the bowl, as the end of the load is reached, into the discharge opening 80. If desired, the motor 30 can be stopped for a period of time until a substantial amount of the material has discharged by gravity, and then the main motor 30 can be momentarily energized, preferably several times, to assure that all of the bowl contents are carried into the chopper. Once this has occurred, the main motor 115 is operated in the reverse direction to close the slide 88.

FIG. 6 shows a typical control circuit, in which electrical supply lines 120 are connected through the contacts C-11, C-12, and C-13 of a main contactor or control relay to the various motors of the apparatus. A power transformer 122 has its primary winding connected to the supply lines, and its secondary winding provides an isolated power supply to the various elements of the timing and control circuit. As shown, the coil C-1 of the main contactor can be energized by closing the normally open manual start switch 124, and the holding contacts C-14 of this contactor will then keep it energized. This circuit can be broken either by opening the normally closed manual stop switch 125, or by opening the safety interlock switch 126 which is held closed only when the bowl cover 22 is properly in its closed position. Thus the apparatus cannot start or run if this cover is open.

It will be noted that this main starting circuit also controls power supplied to lines 128, 129. These lines lead to the timing circuits, the first of which includes the mode control manual switch 130 in the circuit of the coil of relay R-2. In the open position shown, switch 130 is in the manual mode, and the automatic control mode is provided when this switch is moved to its other contact, to supply power through R-2 when the main power circuit is energized, and when this occurs the contacts R-21 are closed. The circuit in which these contacts are connected includes the line 129 and a normally open manual switch 133 which controls the start of an automatic operating cycle. Closing this switch when R-2 is energized will complete a circuit through the coil R-1 of the first timing relay, this circuit including the normally closed timing contacts T-11. When R-1 is energized, its holding contacts R-11 closes to bypass switch 133 and hold R-1 energized after this switch is released.

This same action completes a circuit through the timing delay relay T-1, whose normally closed contacts T-11 are in the circuit of R-1. This time delay relay is of a conventional type which will not actuate until some predetermined time after power is applied to it. In a typical embodiment, the time delay relay T-1 has a total delay time of up to one hundred and sixty seconds, and this time can be adjusted to a lesser value if desired. When the delay time of relay T-1 has elapsed, it will open its normally closed contacts T-11, thereby deenergizing R-1, which in turn will open its contacts R-11 and remove all power from the timing circuit.

At the same time T-1 is energized, a circuit containing a second time delay relay T-2 also is energized. Its normally open contacts T-21 are then closed, completing a power supply circuit to a further time delay relay T-3. In a typical embodiment the delay time of T-2 is approximately thirtly seconds, and the delay time of T-3 is in the order of four to five seconds. It should be noted that when relay R-2 is energized its normally open contacts R-22 are closed, and its normally closed contacts R-23 are open. Therefore, simultaneously with the closing of contacts T-21, power is supplied through the now closed contacts R-22 to the coil GR of the grinder motor contactor, closing its contacts GR-1, GR-2, and GR-3 and supplying power to the grinder motor 98. It should be kept in mind, however, that this does not occur until the delay time of T-2 has elapsed.

When R-2 is energized, as soon as the automatic mode is selected, its normally open contacts R-24 close, and conversely its normally closed contacts R-25 will open. These are arranged in parallel circuits for supplying power to the coil CC of the cutter motor contactor. The contacts CC-11, CC-12, CC-13 of this contactor control the power supply to the cutter motor 30. Thus, with R-24 closed, as soon as switch 133 is closed power is supplied through the normally closed timing contacts T-31 to the cutter contactor CC. This starts the cutter motor immediately in the beginning of the cycle, however after the time span of the delay relay T-3 has elapsed, its normally closed contacts T-31 will open and this circuit will be broken. Thereafter, power is supplied intermittently to the contactor coil CC through the cyclicly operated switch CS, and this switch in turn is controlled by a cam (not shown) driven by the timer motor TM which operates during the entire length of the automatic cycle, in other words during the time span of T-1. In a typical arrangement switch CS will repeatedly close for one second and then open for six and one-half seconds.

When the time span of T-2 is elapsed, its contacts T-21 will close and with contacts R-22 already closed, this will supply power to the coil of relay R-3, which has a normally open contact R-31 and a normally closed contact R-32, respectively, in the control circuit of the gate control 115. At the same time power is supplied to the coil GR of the grinder contactor, as mentioned previously, thus operating the grinder motor 98.

The disc 110 which is driven by the gate motor 115 also provides a means for operating the limit switches LO-1 and LC-1, which are in respective parallel power supply circuits with R-31 and R-32, to provide alternate circuits for energizing the gate motor 115. When relay R-3 is energized, R-31 closes and R-32 opens. In this position of the gate, switch LO-1 is closed, therefore a circuit is completed through the gate motor and this circuit remains until the gate reaches its open limit, at which time switch LO-1 opens. At this time LC-1 is closed, therefore when R-3 is deenergized the closing of its contact R-32 will complete a circuit to operate the disc 110 through another 180 degrees, returning the gate 88 to its closed position.

From the foregoing, it is seen that starting the automatic cycle by closing switch 133 causes the cutter motor 30 to operate immediately, and after a predetermined time the grinder motor 98 is energized and the gate motor 115 is energized to open gate 88. The cutter discharges its contents into the grinder at this time, and the cutter motor continues to operate for an additional four to five seconds, the time span of the delay relay T-3. Thereafter, the cutter motor is cycled on at periodical intervals by closing of the switch CS by the timer motor, assisting the complete discharge of the cutter bowl.

During the entire operation, the mixer motor 77 is operated alternately in reverse and forward directions. This is accomplished under the control of cam operated switch AM, also driven by the timer motor TM, and arranged to close, for example, approximately three seconds on each of its two contacts. As will be seen from the circuit diagram in one position this completes a circuit through the coil of the forward contactor MF, closing its contacts MF-1, MF-2, and MF-3, and in the other position the coil of the reverse contactor MR is energized, closing its contacts MR-1, MR-2, and MR-3. These respective sets of contactors control the power supply to motor 77 for operating it either in forward or reverse direction, thus the mixing baffle 70 moves around the bowl first in one direction and then the other. In order to limit this operation to the time of the automatic cycle, relay R-2 has contacts R-26 in the circuit. The common connection of switch AM, through the contacts R-26, in turn is connected to the main control circuit including switch 133 and contacts R-11 and R-21. Since R-1 is deenergized at the end of the automatic cycle, R-11 will open to break this power supply circuit.

Various manual control circuits are provided to enable the operator to operate the grinder, or the cutter, or the mixer motor independently, as when switch 130 is in the manual mode. The manual cutter control switch 135 is normally open, but is connected between the power supply line 129 and the normally closed contacts R-25 of relay R-2. When this relay is deenergized, these contacts are closed and power can be supplied by closing switch 135 directly to the cutter motor contactor CC. Similarly, a normally open manual switch 137 is connected in a circuit from supply line 129 to the normally closed contacts R–23. When R–2 is deenergized, closing switch 137 will supply power to the grinder contactor GR and to the relay coil R–3. A further circuit extends from line 129 through normally closed contacts R–27 of relay R–2. These contacts are in turn connected to the common contact of a two-position (center off) manual switch 140. As can be seen from the diagram, moving this switch to one position will energize the forward contactor MF, and in the other position it will energize the reverse contactor MR of the mixer motor 77. Therefore, the cutter, grinder, and the mixer can be operated manually, independently of the automatic cycle control, and whenever the grinder is operated the gate will be moved to its open position.

It should be understood that equivalent arrangements may be provided in place of the gate 88, although the gate is preferred. For example, by arranging the controls such that the worm 92 either does not operate at all for a predetermined period while the cutting apparatus is in operation, or alternatively by reversing the motor 98 to drive the grinder screw 92 in a reverse direction during this period, it is possible to retain essentially all of the material in the bowl for the cutting and mixing operation. Under such circumstances only a relatively insignificant amount of material might enter the discharge opening 80 and the throat 85 of the grinder before being completely cut into small pieces. If the operator desires, with this type of arrangement he can merely return the first small quantity of material that emerges from the grinder to the inlet hopper 28.

It is also possible, in place of the gate 88, to provide a modified worm 92a (FIG. 7) having a blank segment 92b of sufficient size to cover the passage between the throat 85 and the barrel of the grinder. With this alternate form, the blank segment on the worm can be positioned, by stopping the motor 98 at the proper time, to cover the grinder inlet and function in fact as a form of gate. This can readily be achieved by providing a cam (not shown) rotatable with the worm shaft and controlling a normally closed switch connected from between R–22 and 6R to line 129. Thus relay 6R can remain energized until the worm reaches the desired position even though T–21 has opened to stop the grinder motor. Again, a small amount of material may gather in the grinder throat, and can be recirculated as necessary.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for converting large chunks of material directly into a ground product, comprising
    a bowl of circular cross-section, said bowl having side walls sloping upwardly and outwardly from its bottom around the central axis of the bowl;
    a cover for said bowl;
    a rotatable drive shaft extending along the axis of said bowl;
    means defining a discharge opening in the lower portion of said side walls including a gate movable to open and close said discharge opening;
    first drive means connected to rotate said shaft ;
    at least one knife blade driven from said drive shaft to cut the material into small pieces and to propel the pieces along said side walls and through said discharge opening when said gate is open;
    a grinder having a barrel with an inlet opening connected to said discharge opening of said bowl;
    a worm rotatably mounted in said barrel; and
    a second drive means connected to rotate said worm.

2. Apparatus as defined in claim 1, including means mounting said bowl with its said axis inclined such that said discharge opening is approximately the lowest portion of the bowl.

3. Apparatus as defined in claim 1, wherein said first and second drive means are independently operable, a controller connected to open and close said gate automatically, and control means operatively connected to both said drive means and to said controller for actuating them through a cycle in which large chunks are first reduced to small pieces by said knives and then discharged through said gate and processed through said grinder.

4. Apparatus as defined in claim 3, including a rotary baffle member in said bowl arranged to sweep said side walls and to assist in recirculation of material toward said knife blade, a third drive means for said baffle member, and connections from said control means to said third drive means for operating said baffle in coordinated relation to operation of said knife blade.

5. Apparatus as defined in claim 4, wherein said third drive means is reversible, and said control means being arranged to cause periodic reversing of said baffle during its operation.

6. Apparatus as defined in claim 1, including means driven from said shaft separate from said knife blade and arranged to sweep said bottom of said bowl to discharge contents of said bowl completely through said discharge opening.

7. Apparatus as defined in claim 2 wherein said mounting means supports said bowl with its central axis inclined between 15 and 30 degrees from vertical.

8. Apparatus for converting large chunks of material directly into a ground product, comprising
    a bowl of circular cross-section and having side walls sloping upwardly and outwardly from said bottom around the central axis of the bowl and a cover for said bowl;
    a rotatable drive shaft extending along the axis of said bowl;
    means mounting said bowl with its said axis inclined;
    means defining a discharge opening in the lower portion of said side walls;
    first drive means connected to rotate said shaft;
    at least one knife blade driven from said drive shaft to cut the material into small pieces and to propel the pieces along said side walls and through said discharge opening;
    a grinder having a barrel with an inlet opening connected to said discharge opening of said bowl;
    a worm rotatably mounted in said barrel;
    a second drive means connected to rotate said worm; and
    control means operatively connected to both said drive means for causing large chunks of material to be reduced to small pieces by said knives and then processed through said grinder.

9. Apparatus as defined in claim 8 including mounting means supporting said bowl with said axis inclined between 15 degrees and 30 degrees from vertical locating said discharge opening such that most of the contents of said bowl can flow by gravity into said opening.

10. Apparatus as defined in claim 9 including means arranged to sweep the bottom of said bowl below said blade and driven by said shaft to discharge completely the contents of said bowl.

11. Apparatus as defined in claim 8 wherein said control means is constructed and arranged to prevent rotation of said grinder worm during an initial period of operation of said first drive means.

12. Apparatus as defined in claim 8 wherein said control means is constructed and arranged to rotate said second drive means in reverse direction for an initial period and then to operate said second drive means in forward direction for a second period while operating said first drive means during such initial period and at least a portion of said second period.

13. Apparatus as defined in claim 8 wherein said worm includes a segment capable of closing said grinder inlet opening, and said control means including switch arranged to stop said second drive means with said segment blocking the grinder inlet during a portion of the time said first drive means is operated.

14. Apparatus for converting large chunks of material directly into a ground product, comprising
a bowl of circular cross-section and having side walls sloping upwardly and outwardly from said bottom around the central axis of the bowl and a cover for said bowl;
a rotatable drive shaft extending along the axis of said bowl;
means mounting said bowl with its said axis inclined;
means defining a discharge opening in the lower portion of said side walls;
first drive means connected to rotate said shaft;
at least one knife blade carried by said drive shaft spaced above the bottom of said bowl;
means carried by said drive shaft below said knife blade and arranged to sweep the bottom of said bowl to discharge completely the contents of said bowl through said discharge opening;
a grinder having a barrel with an inlet opening connected to said discharge opening of said bowl;
a worm rotatably mounted in said barrel; and
a second drive means connected to rotate said worm.

References Cited

UNITED STATES PATENTS

| | | |
|---|---|---|
| 1,032,258 | 7/1912 | Wefing. |
| 3,053,297 | 9/1962 | Bründler _____ 146—192 |
| 3,054,431 | 9/1962 | Hartley et al. _____ 146—186 X |
| 3,313,332 | 4/1967 | Stephan et al. _____ 146—192 |

W. GRAYDON ABERCROMBIE, Primary Examiner

U.S. Cl. X.R.

146—68, 78, 182